United States Patent [19]

Edakubo

[11] Patent Number: 4,532,563
[45] Date of Patent: Jul. 30, 1985

[54] CASSETTE TAPE TENSIONING DEVICE

[75] Inventor: Hiroo Edakubo, Tokyo, Japan

[73] Assignee: Canon Kabushiki Kaisha, Tokyo, Japan

[21] Appl. No.: 375,301

[22] Filed: May 5, 1982

[30] Foreign Application Priority Data

May 18, 1981 [JP] Japan ................................. 56-75481

[51] Int. Cl.³ ............................................. G11B 15/43
[52] U.S. Cl. .................................... 360/96.5; 242/75; 242/200
[58] Field of Search ............................ 360/96.5, 96.6; 242/197, 198, 199, 75, 75.3, 200

[56] References Cited

U.S. PATENT DOCUMENTS 3,936,877  2/1976  Maruyama et al. ................. 242/198

Primary Examiner—Raymond F. Cardillo, Jr.
Assistant Examiner—Steven R. Garland
Attorney, Agent, or Firm—Toren, McGeady, Stanger, Goldberg

[57] ABSTRACT

A cassette tape tensioning device for a cassette tape apparatus or wherein a cassette is placed within a cassette holder which is movable between a first position for receiving the cassette and a second position, with a pair of reel shafts being arranged to engage a pair of reel hubs in the cassette holder when the holder is in the second position and with a transmitting mechanism operating to transmit movement of the holder to at least one of the reel shafts when the holder moves from the first position to the second position, with at least one of the reel shafts being rotated so that the tape recording medium is tensioned between the reel hubs.

5 Claims, 3 Drawing Figures

CASSETTE TAPE TENSIONING DEVICE

BACKGROUND OF THE INVENTION

1. /Field of the Invention:

The present invention relates to a recording or reproducing device in which a cassette housing a recording medium in the form of a tape may be loaded, the device being of the type wherein the tape is tightened during winding thereof with the cassette in the loaded position.

2. Description of the Prior Art:

A cassette type recording or reproducing device is made so that a recording medium or a reproducing medium for example a magnetic tape is wound around a pair of reels within the cassette, with each of the reel shafts and each of the reel hubs being engaged as the cassette is loaded into a main apparatus. When said reel shaft and reel hub are engaged with the tape in a loosened state as the cassette is loaded into the main apparatus, a delay could be encountered before the tape reaches its regular running speed while a recording or reproduction operation is actuated. Furthermore, such looseness could cause erroneous loading especially in a video tape recorder. Therefore it has been necessary to manually tighten the tape before commencing operation of a tape machine in order to properly insure prompt start up of tape running and accurate loading. However, this gives rise to a substantial disadvantage.

A method to automatically tighten up slack in a tape within a cassette utilizes a spiral projection in each of a pair of reel shafts at a tape supply side of the cassette and at a take up side in a manner so as to be in reverse direction to each other. Futhermore, projections of reel hubs engaged resepectively with said spiral projections are provided for tightening the tape automatically at the time of cassette loading. In this method the rotating angle of the reel hub is rather small and could be insufficient for a large slack, and there is the possibility that the tape becomes loosened at the time the cassette is taken out.

SUMMARY OF THE INVENTION

It is an object of the present invention to provide a recording or reproducing device which is free from the above-mentioned disadvantage and which automatically tightens the tape at the time the tape is loaded.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
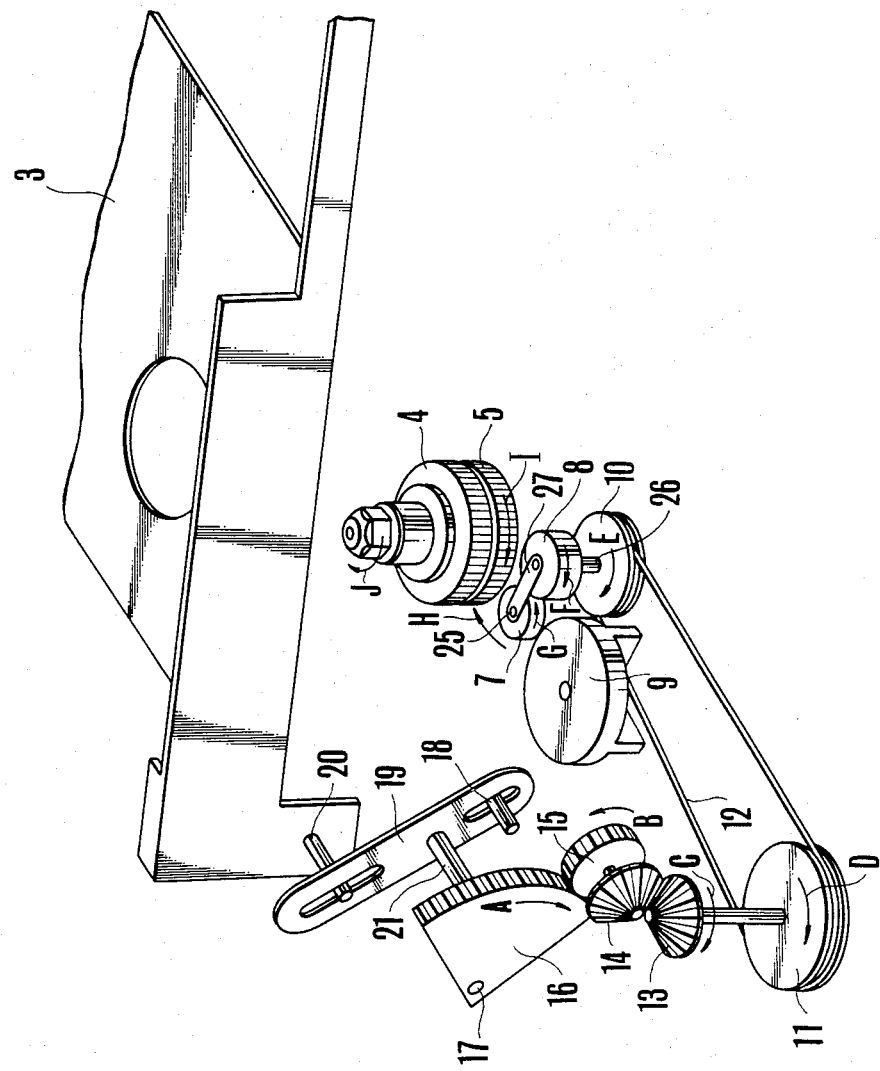
FIG. 1 shows an example of a tightening mechanism for a tape recording medium in a recording or reproducing device according to the present invention.

With reference to the drawings and particularly to FIG. 1, there is shown a tightening mechanism for a tape recording medium in a recording or reproducing device according to the present invention which comprises a cassette holder 3 adapted to hold a cassette, reel stands 4 and 5 operative to take up a tape, and a reel shaft 6. A first idler 7 serving to transmit movement of the cassette holder 3 to the reel stand 5, is in engagement with a second idler 8, while a wind mill wheel 9 constitutes a cushioning device at the time the cassette is taken out. Reference numerals 10 to 21 represent a mechanism to transmit movement of the cassette holder to the idler 8, wherein 10 and 11 are pulleys, 12 is a belt, 13 and 14 are bevel gears, 15 is a gear, 16 is a sector gear, 17 is a shaft of the sector gear 16, and 18 is a fixed shaft, 19 is a link, while 20 and 21 are shafts. Also 22 is a spring, and 23 is a spring retainer to retain the spring 22, while 24 is felt to transmit driving power between the reel stand 4 and the reel stand 5. Reference numeral 25 represents a shaft of the idler 7, and 26 is a shaft of the idler 8, while 27 is an idler holding plate to suppport the idler 7 with 28 being a slider.

Figure 2:
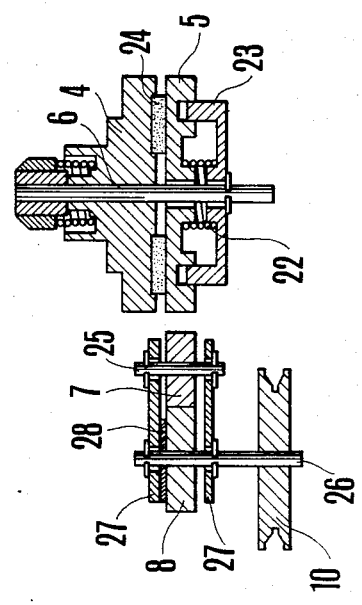
FIG. 2 is a cross sectional view of an important part shown in FIG. 1.

In the device shown in FIG. 1 and FIG. 2, the cassette holder 3 is apart from the reel stand 4 when a cassette is loaded. When the cassette is loaded into the cassette holder 3 and the holder 3 is pressed down, the movement is transmitted to the link 19 by the shaft 20 fixed to the cassette holder 3. The link 19 is coupled to the sector gear 16 with the shaft 21, and the sector gear 16 rotates around the shaft 17. The shaft 17 and the shaft 18 are fixed to a main body of a cassette recorder. A guide groove (not shown) of a sector shape for guiding the shaft 21 is provided in the main body, and thus movement of the cassette holder is transformed into a rotating movement of the sector gear 16 around the shaft 17 to rotate the sector gear 16 in the direction of an arrrow A. This rotating direction is transformed to a rotating direction which is perpendicular to the arrow A as shown by an arrow C. Further, this rotation is transmitted to the idler shaft 26 by the pulley 11, the belt 12 and the pulley 10. The idler shaft 26 is fixed with the idler 8, which in turn is in contact with the idler 7. The idler 7 is retained by the idler holding plate 27 and the idler shaft 25, and the idler holding plate 27 is attached to the idler shaft 26. Since the idler holding plate 27 and the idler 8 are in frictional contact with each other through the slider 28, the idler holding plate 27 rotates around the idler shaft 26 in the same direction as the rotating direction of the idler 8 by the rotation of the idler 8.

Therefore the movement to press down the cassette holder 3 is transformed into rotation in the direction of an arrow F in the idler 8, rotating the idler holding plate 27 in the direction of an arrow H. Therefore, the idler 7 abuts on the reel stand 5, rotating the reel stand 5 in the direction of an arrow I for tightening the tape until the cassette is set in the reel stand.

As shown in FIG. 2, the reel stand 5 can rotate freely about the reel shaft 6, and the reel stand 4 is affixed with the reel shaft 6. Also, the reel stand 5 is in a pressure contact with the reel stand 4 through the felt 24 by the spring 22 and the spring retainer 23.

Therefore, when the tape is tightened during winding and the tension of the tape increases, slip will be generated between the reel stand 4 and the reel stand 5, and even if the reel stand 5 continues rotation in the direction of an arrow I after the tape has been tightened, no difficulties will be caused in the tape.

Next, when the cassette is taken out, the cassette holder 3 comes off the reel stand 4 by the force of a spring (not shown). Such movement is transmitted by a mechanism including the shaft 20, link 19, sector gear 16, gear 15, bevel gears 14, 13, pulley 11, belt 12, and the pulley 10, to rotate the idler 8 in a direction reverse to that at the time of cassette loading. Therefore the idler holding plate 27 rotates in the direction of the wind mill wheel 9, then the idler 7 comes in contact with the wind mill wheel 9 to rotate the same. A sudden movement of the cassette holder 3 can be cushioned by this series of movements.

Also, at the time of tape recording or reproduction, an increase in the load on the reel stands can be prevented by having the idler 7 apart from the reel stand 5. A mechanism to separate the idler holding plate from the reel stand at a time of recording or reproducing utilizes a link associated with a pinch roller, or an association with a loading ring in a video tape recorder, etc. may be applied.

Figure 3:
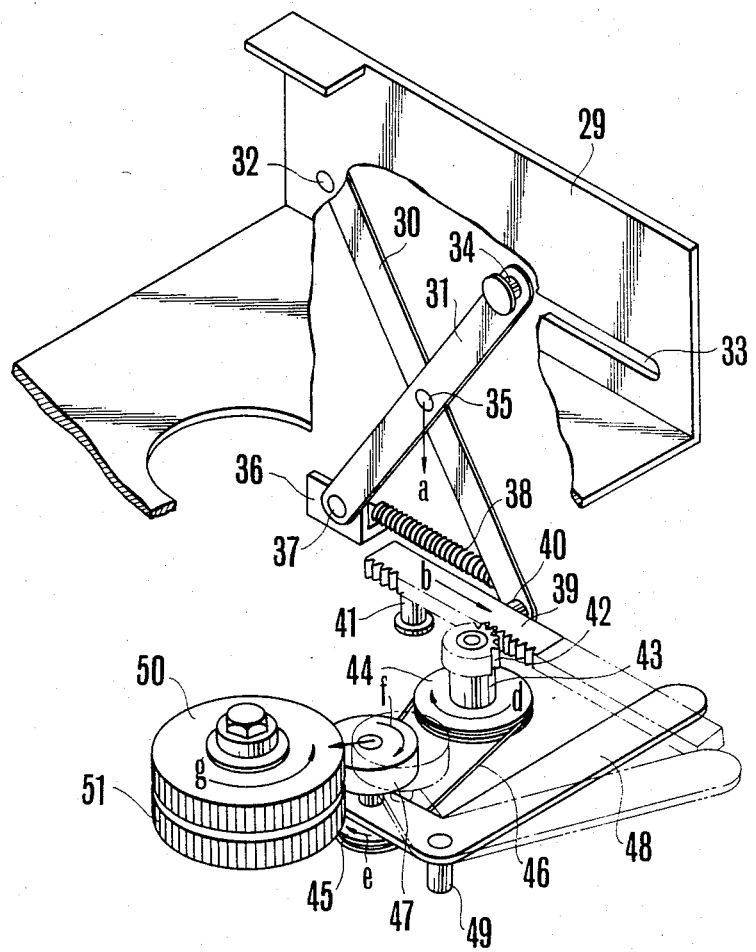
FIG. 3 shows another example of a tightening mechanism of a tape recording medium in a recording or reproducing device according to the present invention.

FIG. 3 shows another example of a tightening mechanism for a tape recording medium in a recording or reproducing device according to the present invention.

In the drawing, 29 is a cassette holder for holding a cassette, and 30 and 31 represent links to support the cassette holder 29. A shaft 32 connects the link 30 to the cassette holder 29 in a freely rotatable manner, and a slot 33 is provided in the cassette holder 29. A shaft 34 is fixed to the link 31 and is fitted into the slot 33. A shaft 35 acts to couple the link 30 and the link 31 in a freely rotatable manner, and 36 is a mounting stand fixed to a main body of the device. A shaft 37 acts fix the link 31 to the mounting stand 36 in a freely rotatable manner, and spring 38 acts to couple the link 30 with the link 31. A rack 39 acts to transform movement of the cassette holder 3 to a rotating movement, and a shaft 40 acts to fix the link 30 to the rack 39 in freely rotatable manner. A shaft 41 operates to guide the rack 39 along a slot (not shown) provided at the main body, and 42 is a pinion, while 43 is a one way clutch. A pulley 44 is connected with a pulley 45 by a belt 46. An idler 47 operates to transmit rotation to a reel, and a supporting plate 48 acts to support the idler, while 49 is a shaft to fix the supporting plate 48 to the main body in a freely rotatable manner. 50 and 51 are supply reel stands.

At the time of cassette loading, the cassette holder 29 is separated from the reel stand. When the cassette is inserted into the cassette holder 29 and is pressed down, the cassette holder 29 moves in the direction of an arrow a by the link 30 and the link 31, and the shaft 40 at a fore end of the link 30 moves the rack 39 in the direction of an arrow b. Such movement is transformed into a rotating movement in the direction of an arrow d by the pinion 42. The rotation of the pinion 42 is transmitted to the pulley 44 by the one way clutch 43 which transmits the rotation in the direction of the arrow d only, while rotation in the direction of an arrow e is transmitted to the pulley 45 through the belt 46. The pulley 45 is supported at the supporting plate 48 in a freely rotatable manner and is biased in the direction of the supply reel stand 51 by a spring not shown. Therefore, the idler 47 comes in pressure contact with the supply reel stand 51 to rotate the reel stand 51 in the take up direction g for tightening the tape. Since the supply reel stand herein has a similar structure as that of the take up reel shown in FIG. 2, there will be no possibility of excessive tightening by frictional contact damaging the tape.

Further, when the cassette holder 29 is completely pressed down, the pinion 42 is shifted to a position shown by chain line and pinion 42 presses the supporting plate 48, whereby the idler 47 is separated from the supply reel stand, and no undesirable tension effect will be produced.

When the cassette is taken out, the cassette holder 29 is moved upwards by the spring 38 by releasing a locking mechanism not shown. At this time a rotation obtained by the lack 39 and the pinion 42 will result in an idle rotation by the one way lutch 43, whereby the supply reel will not operate to loosen the tape.

As has been explained, when a cassette is loaded in a recording or reproducing device according to the present invention, it is possible to tighten during winding the tape recording medium housed in the cassette in association with movement of retaining means such as a cassette holder, etc. Therefore tightening can be accomplished regardless of the size of slack. Also the invention can provide various other functions as shown in the examples while the disadvantage of a conventional device will be avoided.

While specific embodiments of the invention have been shown and described in detail to illustrate the application of the inventive principles, it will be understood that the invention may be embodied otherwise without departing from such principles.

What is claimed is:

1. A cassette tape apparatus for handling a cassette which has a pair of reel hubs and which houses a recording medium in the form of a tape wound around said pair of reel hubs, comprising:
   a cassette holder for holding therein said cassette, said cassette holder being movable by only the motive power occurring by a manual operation from a first position to a second position, said first position being a position for receiving said cassette;
   a pair of reel shafts arranged to engage with said pair of reel hubs when said holder is in said second position; and
   a driving mechanism for driving at least one of said reel shafts by utilization of the motive power occurring by said manual operation so as to tighten the winding of said recording medium when said holder moves from said first position to said second position.

2. Apparatus according to claim 1, wherein said driving machanism includes:
   a one-way clutch for transmitting only the motive power which occurs when said holder moves from said first position to said second position.

3. A cassette tape apparatus having a tape tensioning mechanism, comprising:
   a cassette holder including a pair of reel hubs and adapted to hold therein a cassette which houses a recording medium in the form of a tape wound around said pair of reel hubs, said cassette holder being movable between a first position and a second position, said first position being a position for receiving said cassette;
   a pair of reel shafts arranged to engage with said pair of reel hubs when said holder is in said second position;
   a transmitting mechanism for mechanically transmitting movement of said holder to at least one of said reel shafts when said holder moves from said first position to said second position, with at least one of said reel shafts being rotated so that said recording medium is caused to be tensioned between said reel hubs; and a one-way clutch for transmitting only that movement which occurs when said holder moves from said first position to said second position; wherein said clutch rotates as said holder moves, said clutch including a first rotary member having a movable axis of rotation, a second rotary shaft drivingly connected to one of said reel shafts, and a third rotary member serving as a damper;

whereby when said holder is moving from said first position to said second position, said first rotary member is brought into abutting engagement with said second rotary shaft as said axis of rotation moves and when said holder is moving from said second to said first position, said first rotary member is abuttingly engaged on said third rotary member.

4. Apparatus according to claim 3, further including:

a fourth rotary member which rotates as said holder moves, a fifth rotary member drivingly engaged with one of said reel shafts, and a restricting member for restricting the force transmitted between said fourth and fifth rotary members.

5. A cassette tape apparatus for handling a cassette which has a pair of reel hubs and which houses a recording medium in the form of a tape wound around said pair of reel hubs, comprising:

a cassette holder for holding therein said cassette, said cassette holder being movable between a first position and a second position, said first position being a position for receiving said cassette;

a pair of reel shafts arranged to engage with said pair of reel hubs when said holder is in said second position; and a driving mechanism for driving at least one of said reel shafts by application of motive power activated by movement of said holder when said holder moves from said first position to said second position, with at least one of said reel shafts being rotated, and said recording medium being caused to be tensioned between said reel hubs;

wherein said driving mechanism includes a first rotary member which rotates as said holder moves, a second rotary member drivingly engaged with one of said reel shafts, and a restricting member for restricting transmission of the motive power between said first rotary member and said second rotary member.

* * * * *